A. ANDERSON.
PNEUMATIC TIRE INFLATING DEVICE.
APPLICATION FILED APR. 28, 1915.
1,204,232.
Patented Nov. 7, 1916.
2 SHEETS—SHEET 2.
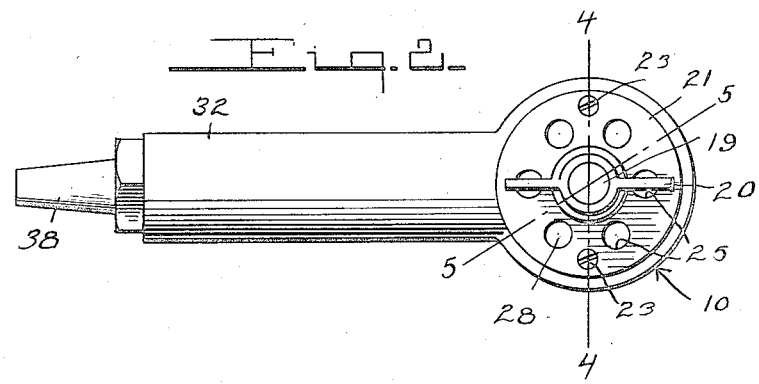
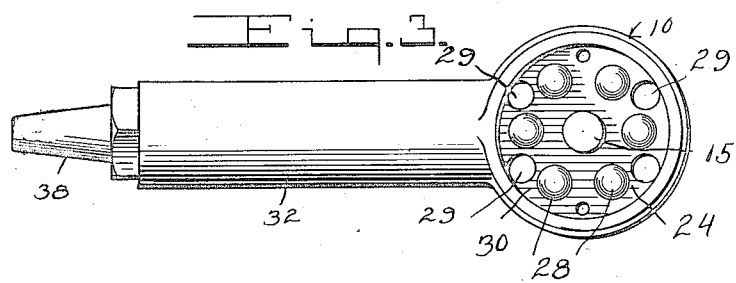
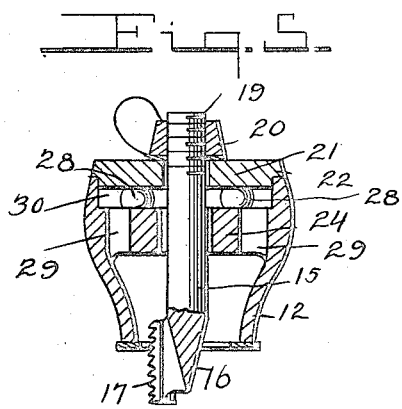
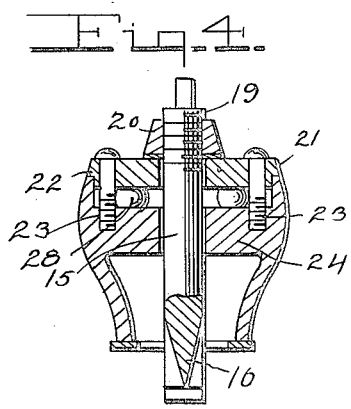
Inventor
A. Anderson

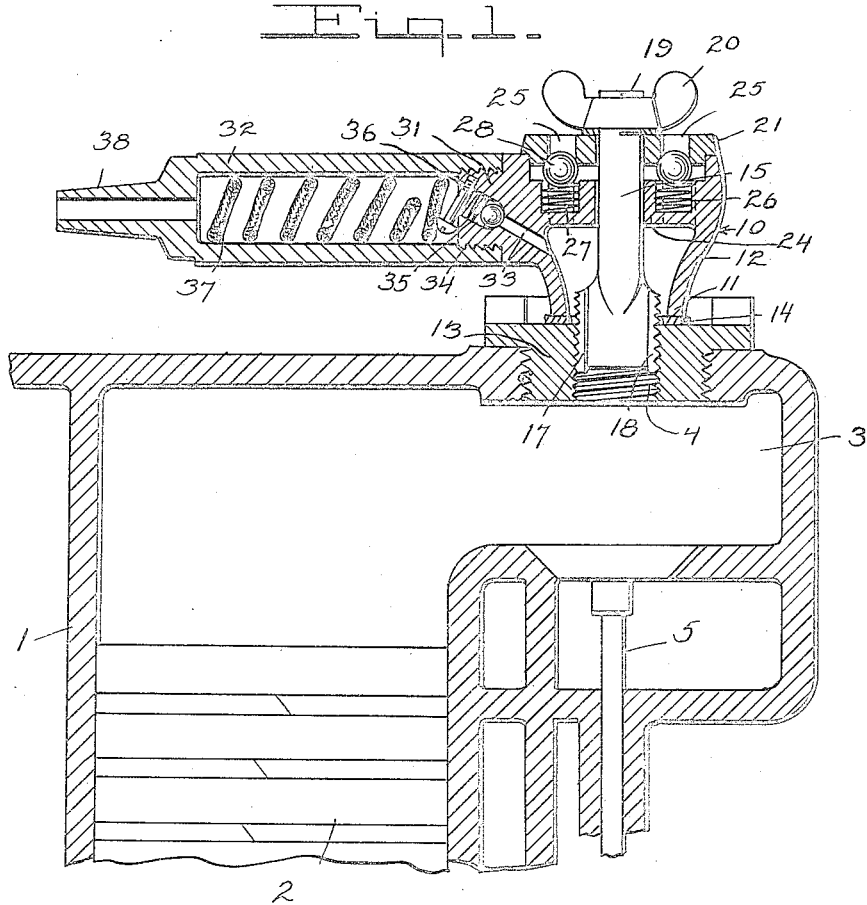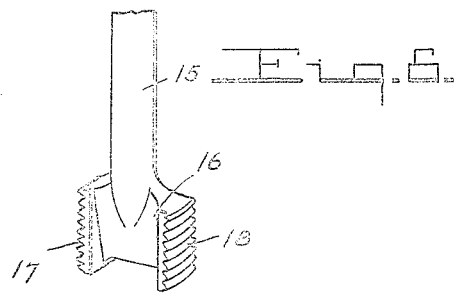

UNITED STATES PATENT OFFICE.

ANDREW ANDERSON, OF WEST BRIGHTON, NEW YORK.

PNEUMATIC-TIRE-INFLATING DEVICE.

1,204,232. Specification of Letters Patent. Patented Nov. 7, 1916.

Application filed April 28, 1915. Serial No. 24,506.

*To all whom it may concern:*

Be it known that I, ANDREW ANDERSON, a subject of the King of Norway, residing at West Brighton, in the county of Richmond and State of New York, have invented certain new and useful Improvements in Pneumatic-Tire-Inflating Devices; and I do hereby declare the following to be a full, clear, and exact description of the invention, such as will enable others skilled in the art to which it appertains to make and use the same.

This invention relates to a device for inflating the inner inflatable tubes of pneumatic tires, and the primary object of this invention is to provide a device of this nature, which is applicable for connection with one of the cylinders of an internal combustion engine, such as is commonly used for the propulsion of automobiles, motorcycles or like motor vehicles, for utilizing the compressing action of the piston of one of the cylinders of the engine, for inflating the tire.

Another object of this invention is to provide a device as specified, which includes inlet valves, which are operable upon the downward movement of the piston for permitting of the inrush of fresh air into the cylinder, which is compressed and forced upwardly through the device into the inner inflatable tube of a pneumatic tire.

Another object of this invention is to provide means for filtering the air for removing oil, moisture, or the like from the air prior to the insertion into the inflatable tube.

A still further object of this invention is to provide a novel form of construction for attaching the inflating device to one of the cylinders of an internal combustion engine.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a sectional view through the improved attachment, showing the same connected to one of the cylinders of an internal combustion engine, Fig. 2 is a top plan view of the device removed, Fig. 3 is a view of the inflating device, showing the cover plate removed therefrom, Fig. 4 is a cross section on the line 4—4 of Fig. 2, Fig. 5 is a section on the line 5—5 of Fig. 2, and Fig. 6 is a fragmentary perspective view of the means employed for attaching the inflating device to the spark plug of one cylinder of an internal combustion engine.

Referring more particularly to the drawings, 1 designates a cylinder of an ordinary internal combustion engine, which has a piston 2 formed therein, and a compression chamber 3. The cylinder 1 is provided with the ordinary type of internally screw threaded openings 4, by means of which a spark plug is usually attached to the cylinder for igniting the charge within the chamber 3. The inlet valve is indicated by the numeral 5 in Fig. 1 of the drawings.

In applying the improved inflating device, which is generically indicated by the numeral 10, the spark plug (not shown), is removed from the opening 4, and the lower end 11, of the casing 12 of the inflating device, is positioned upon the upper edge of the plug 13, which is provided with the openings 4. A gasket 14 is placed between the lower end of the housing 12 and the upper edge of the plug 13, for forming a fluid-tight connection between the housing and the plug. The housing 10, has a vertically extending bolt 15 inserted therethrough, the lower end 16 of which is flattened, and has arcuate flanges 17 and 18 formed upon its edges, which flanges are externally screw threaded for co-action with the internal screw threads of the openings 4, for attaching the inflating device to the cylinder 1. The upper end of the bolt 15 is externally screw threaded, as shown at 19, and a wing nut 20 is mounted thereon, which binds against the upper surface of the removable cover or top 21 of the housing 12, when the flanges 17 and 18 are screw threadably connected to the internal screw threads of the openings 4, and reach the limit of their downward or inward movement.

The cover 21 is provided with a flange 22, which rests upon the upper edge of the casing or housing 12, and it is held in place thereon, by a pair of bolts or analogous fastening devices 23, which are inserted through the head or cover 21 and into a transversely extending web 24, which is formed within the housing 12. The cover 21 is provided with a plurality of openings 25 extending therethrough, which aline with recesses 26 formed in the web 24. The recesses 26 have springs 27 mounted therein, upon which rest balls 28, forming a spring controlled ball valve for permitting of the inlet of air through the openings 25 and into the housing 12, and through the same into the chamber 3.

The web 24 is provided with openings 29, which communicate with the space 30, between the under surface of the cap or cover 21 and the upper surface of the web 24, for permitting of the passage of air which enters the casing or housing, through the web and into the lower compartment of the casing or housing 12, from whence it passes through the openings 4 and into the chamber 3.

The housing 12 has a boss 31 extending outwardly from one side thereof, which is provided with external screw threads, so as to provide for the detachable connection of a tube 32, to the housing. The boss 31 is provided with an angularly disposed duct 33, which communicates with the interior of the housing 12, and has a spring controlled ball valve 34 mounted therein. The spring 35, which controls the action of the ball valve 34, has one end connected to a screw 36, which is inserted through the boss 31 substantially at right angles to the duct 33.

The tube 32 has a coil of absorbent material 37 mounted therein, which coil is preferably formed of fine wire intercoiled with cotton or other absorbent material, which coil is provided for filtering the air upon its passage through the tube, for removing liquid ingredients therefrom. The tube 32 has its outer end 38 reduced, for forming a nozzle, which is adapted for connection with any suitable type of flexible hose or conduits, for connecting the tube 32 to the inlet valve of an inflatable tube of a pneumatic tire.

When attaching the inflating device to one of the cylinders of an internal combustion engine, a push rod which operates the intake valve, is disconnected, for preventing the passage of volatile fuel into the cylinder, and the spark plug is removed therefrom, after which the housing 12 is connected to the cylinder in the manner heretofore described. The downward stroke of the piston 2 will create a suction within the cylinder, which will draw air into the same, through the openings 25. The upward stroke of the piston will force the air upwardly out of the cylinder, through the opening 33, and the tube 32, for inflating the inner inflatable tube of a pneumatic tire. The air will be filtered by passage through the tube 32, and the coil 37, which is positioned therein.

From the foregoing description taken in connection with the accompanying drawings the advantages of construction and of the method of operation of the improved pneumatic tire inflating device will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. A valve comprising a housing, said housing having its upper end open, a cover for connection to said housing, a bolt extending through said cover and having its lower end flattened, arcuate flanges formed upon the edges of the flattened end of said bolt, said arcuate flanges being externally screw threaded for detachably fitting in a threaded opening for connecting said housing in position and binding said cover to said housing, a horizontally disposed web positioned within said housing, said cover and web being provided with a plurality of openings permitting of the inlet of air into said housing, spring controlled ball valves carried by said web for controlling the passage of air through said openings, a sleeve detachably connected to said housing, and an absorbent coil positioned within said sleeve for filtering the air upon passage therethrough, said sleeve communicating with said outlet opening, said sleeve also having its outer end reduced for forming a nozzle for connection with a flexible conduit.

2. A valve comprising a housing, said housing having its upper end open, a cover for connection to said housing, a bolt extending through said cover and having its lower end flat, arcuate flanges formed upon the edges of the flattened end of said bolt, said arcuate flanges being externally screw threaded for detachably fitting in a threaded opening and connecting said housing in position and binding the cover upon said housing, a horizontally disposed web positioned in said housing, said cover being provided with a plurality of openings for permitting of the inlet of air into said housing, and spring control ball valves carried by said web for controlling the passage of air through said openings, a sleeve detachably connected to said housing and an absorbent coil positioned within said sleeve for filtering the air upon passage therethrough, said sleeve communicating with said outlet openings and having its outer end reduced for forming a nozzle for connection with a flexible conduit.

In testimony whereof I affix my signature in presence of two witnesses.

ANDREW ANDERSON.

Witnesses:
  CHARLES JOHNSON,
  ANDREW ANDERSON.